United States Patent
Berliner et al.

(10) Patent No.: US 11,487,728 B2
(45) Date of Patent: Nov. 1, 2022

(54) UNIFIED-PERSON RECORD HAVING PERIODIC TABLE OF RELATIONSHIPS

(71) Applicant: CampMinder, LLC, Boulder, CO (US)

(72) Inventors: Paul Berliner, Boulder, CO (US); Dan Konigsberg, Boulder, CO (US)

(73) Assignee: CAMPMINDER, LLC, Boulder, CO (US)

( * ) Notice: Subject to any disclaimer, the term of this patent is extended or adjusted under 35 U.S.C. 154(b) by 576 days.

(21) Appl. No.: 14/846,633

(22) Filed: Sep. 4, 2015

(65) Prior Publication Data
US 2016/0231882 A1 Aug. 11, 2016

Related U.S. Application Data

(60) Provisional application No. 62/045,798, filed on Sep. 4, 2014.

(51) Int. Cl.
*G06F 16/22* (2019.01)
*G06F 3/04817* (2022.01)
*G06F 16/16* (2019.01)
*G06Q 10/06* (2012.01)

(52) U.S. Cl.
CPC .......... *G06F 16/22* (2019.01); *G06F 3/04817* (2013.01); *G06F 16/168* (2019.01); *G06Q 10/0631* (2013.01)

(58) Field of Classification Search
CPC .... G06F 3/04817; G06F 16/22; G06F 16/168; G06Q 10/0631; G06Q 50/01; H04N 1/00432; H04N 1/00405
See application file for complete search history.

(56) References Cited

U.S. PATENT DOCUMENTS

| | | | | |
|---|---|---|---|---|
| 8,332,782 | B1 * | 12/2012 | Chang | H04L 12/6418 707/794 |
| 8,775,517 | B1 * | 7/2014 | Goldman | G06Q 50/01 705/319 |
| 2005/0154606 | A1 * | 7/2005 | Terzidis | G06Q 99/00 715/853 |
| 2005/0222890 | A1 * | 10/2005 | Cheng | G06Q 10/109 705/7.19 |
| 2008/0270458 | A1 * | 10/2008 | Gvelesiani | G06F 16/288 |
| 2010/0023484 | A1 * | 1/2010 | Zink | G06Q 10/06 707/E17.014 |
| 2010/0057643 | A1 * | 3/2010 | Yang | H04M 1/72522 706/11 |

(Continued)

*Primary Examiner* — Maryam M Ipakchi
(74) *Attorney, Agent, or Firm* — Berg Hill Greenleaf Ruscitti LLP

(57) ABSTRACT

A system and method for handling records of an organization, the system and method involving: a graphical user interface operable by way of instructions, the graphical user interface can display a contact area including contact information corresponding to an individual related to the user's organization and a periodic table of relationships corresponding to at least one relationship of the selected individual. The operability of the graphical user interface is facilitated by at least one server. The display of the at least one record is facilitated by at least one client device. The at least one client device is capable of connecting with the at least one server via a network. The at least one server is capable of being cloud-based.

12 Claims, 6 Drawing Sheets

(56) References Cited

U.S. PATENT DOCUMENTS

| | | | |
|---|---|---|---|
| 2011/0041095 A1* | 2/2011 | Reed | G06F 3/0481 |
| | | | 715/834 |
| 2011/0099486 A1* | 4/2011 | Nesladek | H04M 1/04 |
| | | | 715/753 |
| 2011/0283222 A1* | 11/2011 | McIntyre | G06F 3/0482 |
| | | | 715/777 |
| 2012/0110096 A1* | 5/2012 | Smarr | H04W 4/21 |
| | | | 709/206 |
| 2013/0080521 A1* | 3/2013 | Souza | G06Q 50/01 |
| | | | 709/204 |
| 2013/0198179 A1* | 8/2013 | Arnott | G06Q 10/06 |
| | | | 707/736 |
| 2014/0101149 A1* | 4/2014 | Winters | G06F 16/958 |
| | | | 707/736 |
| 2014/0195975 A1* | 7/2014 | Kyoun | G06F 3/0482 |
| | | | 715/825 |

* cited by examiner

UNIFIED-PERSON RECORD HAVING PERIODIC TABLE OF RELATIONSHIPS

CROSS REFERENCE TO RELATED APPLICATIONS

This application claims the benefit of U.S. Provisional Patent Application No. 62/045,798, filed on Sep. 4, 2014, and titled "Unified-Person Record Having Periodic Table of Relationships" which is incorporated by reference herein in its entirety for all purposes.

TECHNICAL FIELD

1. Technical Field

The present disclosure technically relates to the field of graphical user interfaces. More particularly, the present disclosure relates to a user interface for organizations such as camps, schools, or other such organizations configured to display information and inter-relationships between individuals and organizations in a clear and precise visual manner.

2. Background

Traditionally, an organization has multiple records that are stored in various databases; such as: financial, medical, and attendance; for the same individual depending on his relationship with the organization, and such records are difficult to keep "in sync." Examples of organizational management software packages in the related art include software for: online registration, self-service parent dashboards, medical records management, form collection, billing and financial suites, program schedulers, transportation management, phone call scheduling, profile pages, lead management and analytics, staff department maps, staff dashboards, staff recruiting management, user management, and email notifications.

Related art organizational management software packages include password-protected webpages with customized enrollment forms for collecting enrollment information and processing payments and enrolling people without extensive data entry. The related art organizational management software uses a webpage that shows a dashboard for the user's to manage their own applications, references, contracts, and forms. The dashboard keeps the individuals informed by sharing news, photos, stories, and other important information. The related art organizational management software further involves user-specific email notifications to further keep the organizational employees informed. Email notifications are preset for items, such as new member leads, form submissions, and staff contracts.

The related art medical records management software uses a webpage for collecting medical history through a self-service dashboard. The related art medical management software can log visits to a health center, track allergies and medications, and print reports. The related art billing and financial software uses a webpage for creating custom payment schedules and tuition plans, sending invoices, and batch-processing electronic payments. The related art billing and financial software can use built-in analytics for running reports and exporting data. The related art profile page software can separately manage individual families, attendees, staff, and alumni. The related art tracking, management, and analytics software use a webpage for tracking new member leads and the enrollment rate for evaluating the organization's business. The related art lead tracking, management, and analytics tools use a webpage that evaluates which geographic areas seem to attract the most interest, and the number of leads the organization has received each month in comparison with previous years. The related art staff recruiting management software streamlines the staff recruiting process by using a webpage for collecting staff applications, managing leads, contacting references, and hiring staff. The staff recruiting management software also allows the user to track pending applicants through a staff lead browser, search an application on the staff profile page, record a job interview, generate a contract, and hire the staff member. The related art organizational management software uses a webpage that has a staff department map that is completed reiteratively as the staff is hired. The staff department map allows the user to track filled and unfilled positions.

However, as shown in these background examples, the current related art does not provide a single user interface that facilitates fully interrelating personal and organizational records to display inter-relationships among all the data supplied to the organization in a visually convenient and pleasing manner which increases the overall usefulness of the individual databases.

SUMMARY

The scope of the present disclosure is defined by the appended claims and by the detailed description, including that of a preferred embodiment, and is not affected to any degree by the statements within this summary. In general, the present disclosure involves systems and methods that provide many beneficial features over the related art, including, but not limited to at least one of the following: (a), providing improved relationship management of individuals in, and related to, an organization; and (b), providing improved access to distributed records.

The present disclosure describes an apparatus comprising a unified-person record configured to be transmitted via a signal and displayed by a server to a user of the server. The unified-person record has a contact area configured to display contact information of an individual associated with an organization.

In another aspect, the unified-person record further includes a person-information area configured to display additional information about the individual including a relationship application identifying names of other individuals or organizations relevant to the individual being displayed in the contact area, and a history application indicating an individual's historical connection to the organization.

In another aspect, the unified-person record further includes an application area having an application-menu area indicating applications being available for selectable use by the user, the applications being dependent on the person's periodic table of relationships. In another aspect, the application area further comprises an application-interface area configured to provide access to the applications being available for selectable use by the user.

The unified-person record also has one or more periodic tables of relationships. A periodic table of relationships comprises an arrangement of two or more tiles positioned in close proximity to each other; the tiles may comprise geometric graphic icons of various dimensions and colors that may also display one or more letters, numbers, or symbols. The periodic table of relationships may also include relationship indicators, color indicators, status indicators, tabs, and additional tabs; all of which may provide separate indications that the user's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

The unified-person record may also comprise a household-information area. Each "household" corresponds to an individual; such as an adult person; e.g., a parent, a guardian, a foster parent, a nanny, or an au pair; and may be either a principal or primary household for a child and/or an alternate household for a Child such as: summer, mother's house, grandparents house, mailing address. Each child may belong to one or more principal, primary, or alternative households.

These and other benefits of the present disclosure will become apparent from the following description, taken in conjunction with the accompanying drawings, wherein, by way of illustration and example, certain embodiments of the present disclosure are set forth. The drawings are intended to constitute a part of this specification and include exemplary embodiments of the present disclosure and illustrate various benefits and features thereof.

BRIEF DESCRIPTION OF THE DRAWINGS

The above, and other, aspects, features, and advantages of several embodiments of the present disclosure will be more apparent from the following Detailed Description as presented in conjunction with the following several figures of the Drawings.

Figure 1:
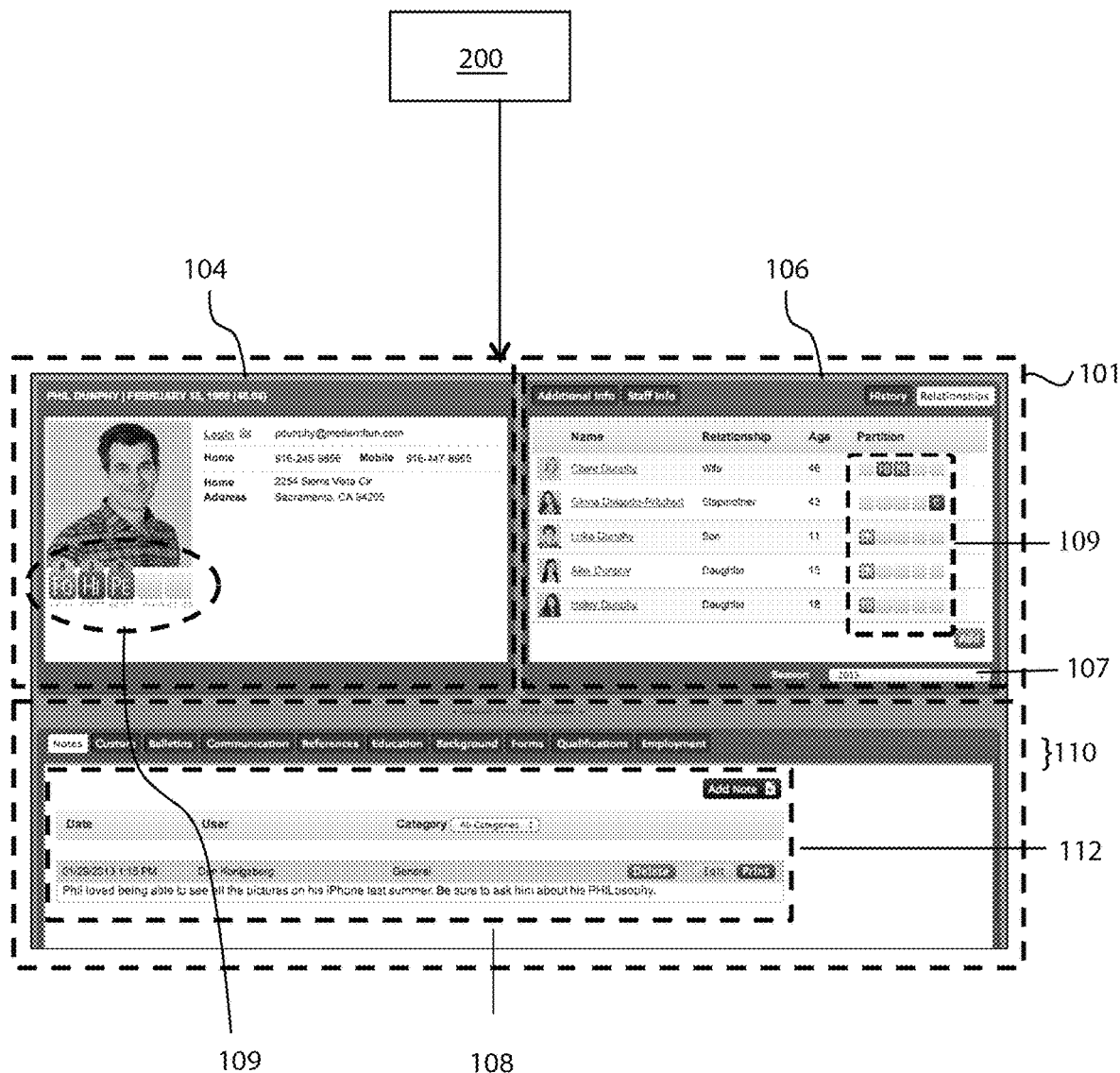
FIG. 1 is a schematic representation illustrating a unified-person record, in accordance with an embodiment of the present disclosure.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, conventional elements that are useful or necessary in commercially feasible embodiment are often not depicted in order to facilitate a less obstructed view of these various embodiments of the present disclosure.

In general, the following reference numerals are used in the present disclosure:
100 Server
101 Unified-person record
102 Household information area
104 Contact area
106 Person-information area
107 Option for display of information in the person-information area according to a particular year or season
108 Application area
109 Periodic table of relationships
110 Application-menu area
112 Application-interface area
114 Relationship indicators
116 Tiles
117 Color indicator
118 Status indicators
120 Tabs
122 Additional tabs
150 User device
152 Network
200 Apparatus

DETAILED DESCRIPTION

The following detailed description is not to be taken in a limiting sense, but is made merely for the purpose of describing the general principles of exemplary embodiments, and many additional embodiments of this disclosure are possible. Understood is that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. The embodiments of the present disclosure can be practiced without one or more of the specific details, or with other methods, components, materials, and so forth; and such practice is encompassed by the present disclosure. In other instances, conventional structures, materials, or operations are not shown or described in detail to avoid obscuring aspects of the present disclosure. Any alterations and further modifications in the illustrated embodiments, and such further application of the principles of the disclosure as illustrated herein are also contemplated as encompassed by the present disclosure.

Unless otherwise indicated, the drawings are intended to be read, e.g., arrangement of parts, proportion, degree, etc., together with the specification, and are to be considered a portion of the entire written description of this disclosure. As used in the following description, the terms "horizontal," "vertical," "left," "right," "up," and "down," as well as adjectival and adverbial derivatives thereof, e.g., "horizontally," "rightwardly," "upwardly," etc., simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The phrases "at least one," "one or more," and "and/or" are open-ended expressions that are both conjunctive and disjunctive in operation. For example, each of the expressions "at least one of A, B, and C", "at least one of A, B, or C", "one or more of A, B, and C", "one or more of A, B, or C" and "A, B, and/or C" denotes A alone, B alone, C alone, A and B together, A and C together, B and C together, or A, B and C together. The terms "a" or "an" element refers to one or more of that element. As such, the terms "a" or "an", "one or more," and "at least one" can be used interchangeably herein. Also noted is that the terms "comprising," "including," and "having" can be used interchangeably.

Figure 12:
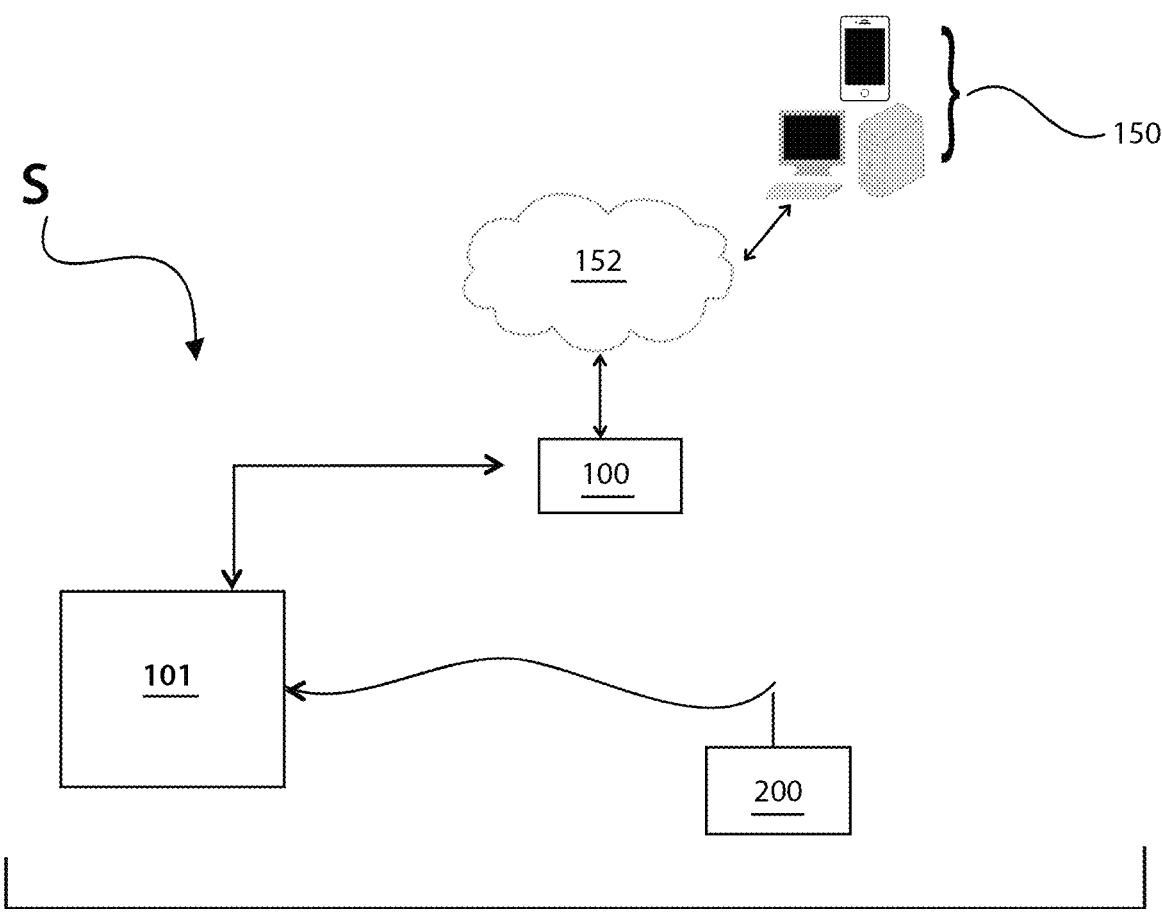
FIG. 12 is a schematic representation illustrating a system, comprising a server configured to display the unified-person record, as shown in FIG. 1, in accordance with an embodiment of the present disclosure.

Referring to FIG. 1, this schematic representation illustrates a unified-person record 101, in accordance with an embodiment of the present disclosure. The unified-person record 101 may be called a software user-interface display, or more simply, a graphical-user interface for use by a server 100, as also shown in FIG. 12. The server 100 may display the unified-person record 101 to authorized users of the server 100. Generally, an apparatus 200 includes, but is not limited to, a unified-person record 101 configured for display, by a server 100, as shown in FIG. 12, to a user (not shown) of the server 100. The unified-person record 101 has a contact area 104 configured to display contact information of an individual associated with the User's organization. The contact area 104 comprises displaying contact information for an individual associated with a User's organization, the contact information may include at least one of: the name of the selected individual, an address, phone numbers (home number, cellular number, fax), an e-mail address, website addresses, social media pages such as Facebook or LinkedIn, and/or a photographic images of the selected individual. The contact area may also comprise a periodic table of relationships 109. This may also include history and person detail applications.

Still referring to FIG. 1, options and variations for the unified-person record 101 may comprise a person-information area 106 comprising displaying names of individuals who are related to the User's organization who are also related to the individual in the contact area 104, and may comprise one or more periodic table of relationships 109.

Still referring to FIG. 1, the unified-person record 101 further includes an application area 108 having an application-menu area 110 indicating applications being available for selectable use by a user; such applications may be used to enter information which determines what is displayed in one or more of the periodic table of relationships 109, such applications may be customizable. The application area 108 further has an application-interface area 112 configured to provide access to the applications being available for selectable use by the user.

The unified-person record 101 may also have one or more periodic table of relationships 109. A periodic table of relationships comprises an arrangement of two or more tiles 116 positioned in close proximity to each other; the tiles 116 may comprise geometric graphic icons of various dimensions and colors that may also display one or more letters, numbers, or symbols. The periodic table of relationships 109 may also include relationship indicators 114, color indicators 117, status indicators 118, tabs 120, and additional tabs 122; all of which may provide separate indications that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

Figure 2:
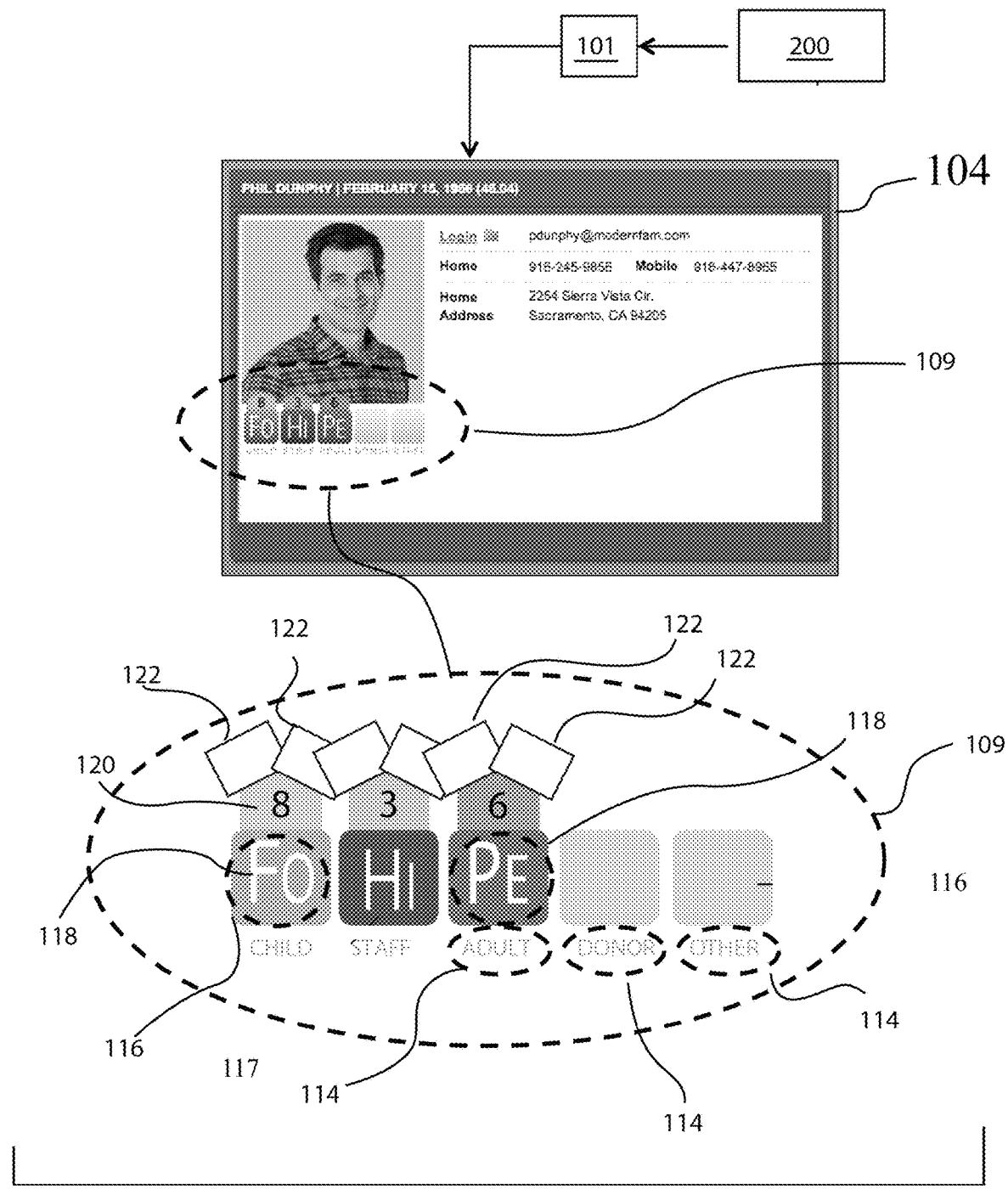
FIG. 2 is a schematic representation illustrating a periodic table of relationships associated with a contact area, as shown in FIG. 1, in accordance with an embodiment of the present disclosure.

Referring to FIG. 2, this schematic representation illustrates a periodic table of relationships 109 as associated with a contact area 104 or person-information area 106, as shown in FIG. 1. In this embodiment of a periodic table of relationships, the dimensions of the tiles 116 are square-like, and the arrangement of tiles are in a single horizontal line of tiles (as depicted), although the dimensions of the tiles 116 may be any suitable dimensions, and the arrangement of tiles 116 may be in any suitable orientation.

The periodic table of relationships 109 may include relationship indicators 114. Relationship indicators may be displayed in close proximity to a specific tile 116 for which they define a specific subset of one or more records of information that the User's organization may keep for an individual; such records may also define one or more relations that specific individual has in relation to at least one of: the User's organization, one or more other individuals, one or more additional organizations, other individuals and/or organizations with each other, and/or other individuals or organizations to said User's organization. For a camp organization, relationship indicators 114 may include: a child indicator, a staff indicator, an adult indicator, a donor indicator, a contact indicator, or additional indicators.

Tiles 114 may have related color indicators 117. A color indicator 117 is one or more color(s) displayed on a tile 116, tab 120, or additional tab 122 that may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization. For example; in the contact area 104, an individual is indicated, below such individual is a periodic table of relationships 109, such periodic table of relationships has a series of tiles 116, said tiles may or may not have relationship indicators 114 that may say "child, staff, adult, donor, and other"; the tile 116 closest to each relationship indicator 114 may have a color indicator 117 that indicates a specific record related to that individual and that relationship indicator 114; such as green; and a green color indicator 117 next to a "child" relationship indicator 114 may mean that the individual in the contact area 104 is under the age of eighteen.

The relationship indicator need not even be present; for example: in the person-information area 106 an individual's name is listed, to the right of said name is a periodic table of relationships 109, said periodic table of relationships has tiles 116, one of said tiles has a color indicator 117, such as blue; said blue color indicator may provide an indication that the individual in the person-information area 106 is an organization that donates to a different individual indicated in the contact area 104. Thus you can see that that color indicator 117 combines a record in relating to a specific individual or organization and such record and specific individual's combined relations to at least one of: the User's organization, one or more other individuals, one or more additional organizations, other individuals and/or organizations with each other, or other individuals or organizations to the User's organization.

Tiles 116 may also have status indicators 118 that comprise one or more letters, numbers, or symbols that may be displayed on a tile 116, tab 120, or additional tab 122. Like color indicators 117, status indicators 118 may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization. For example, a "Fo" status indicator 118 in a tile 116 above a "child" relationship indicator 114 in a periodic table of relationships 109 in a contact area 104 might mean that the individual displayed in the contact area 104 is a former member of the user's organization; if the tile is also green it might also mean the individual is a child.

Tiles 116 may also have one or more tabs 120 attached to them, wherein each tab 120 may comprise geometric graphics of various dimensions and colors that may also display one or more letters, numbers, or symbols. Like tile color indicators 117 and status indicators 118, tabs 120 may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization. For example, a "8" in a tab 120 attached to a tile 116 with a "Fo" status indicator 118 above a "child" relationship indicator 114 in a periodic table of relationships 109 in a contact area 104 might mean that the individual displayed in the contact area 104 was a former child member of the user's organization for eight seasons.

Tabs 120 may also have one or more additional tabs 122 attached to them, wherein each additional tab 122 may comprise geometric graphics of various dimensions and colors that may also display one or more letters, numbers, or symbols. Like tile color indicators 117, status indicators 118, and tabs 120; additional tabs 122 may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization. For example, a additional tab 122 that is "red" and an additional tab 122 with a "2" in it are attached to tab 120 with an "8" in it attached to a tile 116 with a "Fo" status indicator 118 above a "child" relationship indicator 114 in a periodic table of relationships 109 in a contact area 104 might mean that the individual displayed in the contact area 104 was a former child member of the user's organization for eight seasons and has not attended in two years and has been contacted and is not re-enlisting for the next season.

Now that we understand the building blocks of the periodic table of relationships we may appreciate that they may each comprise configuration that facilitates quick visual recognition of information by a user. For example, a tile 114 may be square with a tab 120 that is a polygonal shape, e.g., a five-side polygon shape (a "house" shape) that is attached on top of the tile 114; and an additional tab 122 may comprises a quadrilateral shape that attaches to an angled top plane of the tab 120 creating a upward branching geometric configuration that displays information in manner such that information is displayed in relation to the relative importance of each record displayed allowing the user to quickly determine information about an individual and said individual's relationships to the User's organization, one or more other individuals, one or more additional organizations, other individuals and/or organizations with each other, and/or other individuals or organizations to said User's organization Referring now to FIG. 3, this schematic representation illustrates the person-information area 106 of the unified-person record 101, as shown in FIG. 1, in accordance with an embodiment of the present disclosure. The person-information area 106 is configured so that it may display additional information relevant to the individual identified in the contact area 104 (whose contact information is displayed in the contact area 104). The person-information area 106 may provide additional information, such as (A) historical information about the individual's relationship with the organization, (B) the current relationships the individual holds with other individuals in the organization, (C) attendee information, (D) staff information, (E) at least one telephone number with a hyperlink function, (F) at least one email address with a hyperlink function; and/or (G) other information. The contact area 104 and/or the person-information area 106 display by way of the periodic table of relationships 109, possible relationship types (such as "Child" which may be indicated by relationship indicators 114) and associated color indicators 117 and status indicators 118 for the relationship type (such as "LD" for lead); the following are examples: Child ("LD"), Child ("AP," "WL"), Child ("EN," "RE," "FO," "X"), Staff ("LD," "AP," "HI," "RE," "FO," "X"), Adult ("AP," "WL"), Adult ("EN," "RE," "FO," "X"), Donor ("LD," "DO," "FO"), and/or Other ("C," "G").

The person-information area 106 may also comprise an option for display of information in the person-information area 106 according to a particular year or season 107, such as organization year data, calendar year data, and seasonal data.

Figure 3:
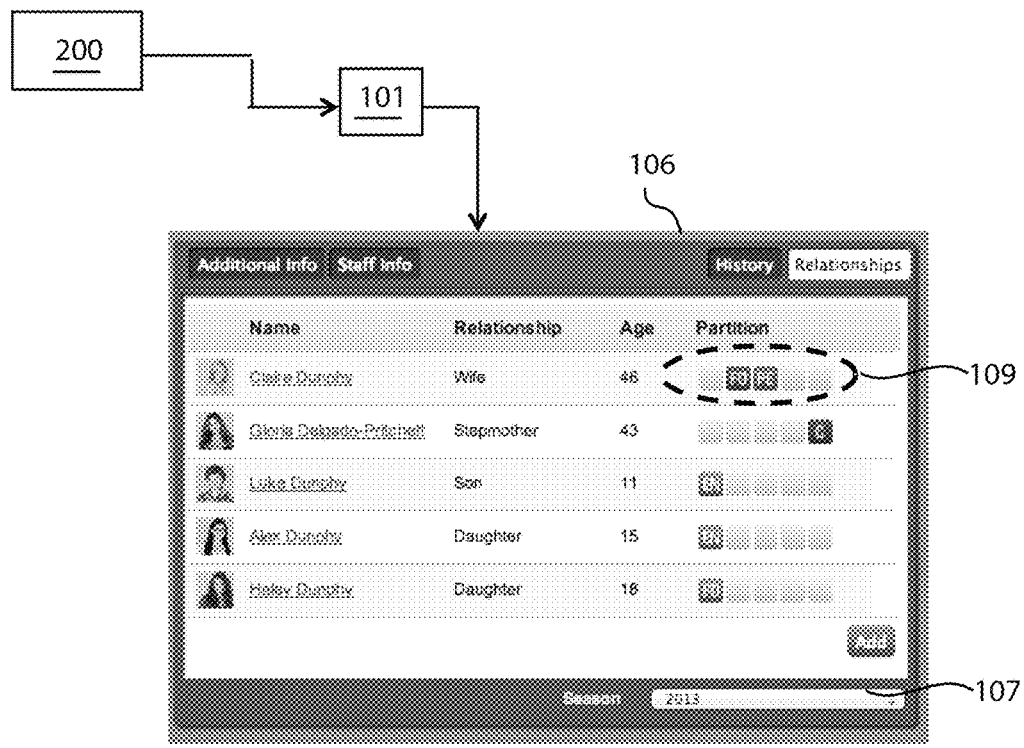
FIG. 3 is a schematic representation illustrating a person-information area of the unified-person record, as shown in FIG. 1, in accordance with an embodiment of the present disclosure.

Still referring to FIG. 3, by way of example, historical information may include the year of attendance, e.g., "1992," with the user's organization; the status associated with the year of attendance, e.g. child status; the status of attendance, e.g. full summer; enrolled program status; location status; bunk number; house number; etc. By way of example, the current relationships may indicate that "Casey Gutmann" is a son of "Lois Gutmann," which implies that the contact area 104 is displaying the contact information for "Lois Gutmann."

The information viewable in either the contact area 104 or the person-information area 106 may be limited by who the specific user is. Assuming a user has their informational records in the database and such information can be used to identify the user, such information can also be used to limit what information is displayed by the Unified person record 101 in the contact 104 and person-information 106 areas. For example, attendee information may only be available to certain attendee contact types. By way of example, the attendee information may include: cabin information, session information, grade, school, years as camper, division, and/or lead source. Likewise, staff information may only be available to certain staff contact types. By way of example, staff information may include status, application date, availability dates, positions for the staff member has applied, positions for which the staff member has been hired, activities for which the staff member has been qualified to instruct, certifications, years as staff member, salary, references, background check information, school, and/or lead source.

The person-information area 106 may be associated with a relationship application (processor-executable instructions). The person-information area 106 may be configured to display a table of individuals associated with the information of the person displayed in the contact area 104, as shown in FIG. 2. The table of individuals may include identifying information for each individual, such as: (A), name of the individual associated with the information of the person displayed in contact area 104, (B) a relationship to the information of the person displayed in contact area 104, (C) an age of the individual associated with the information of the person displayed in contact area 104, (D) a contact type (using the status indicators of the periodic table of relationships 109).

Still referring to FIG. 3, the relationship application is configured to facilitate the addition of relationships (such as familial, professional) in response to the relationship application receiving a command from the user indicated in the contact area 104 to do just so. For example, the following relationships may be added: father, mother, stepfather, stepmother, son, daughter, brother, sister, stepbrother, stepsister, aunt, uncle, niece, nephew, cousin, grandfather, grandmother, step grandfather, step grandmother, doctor, dentist, and/or friends, etc. (as many that may be required or desired).

Figure 4:
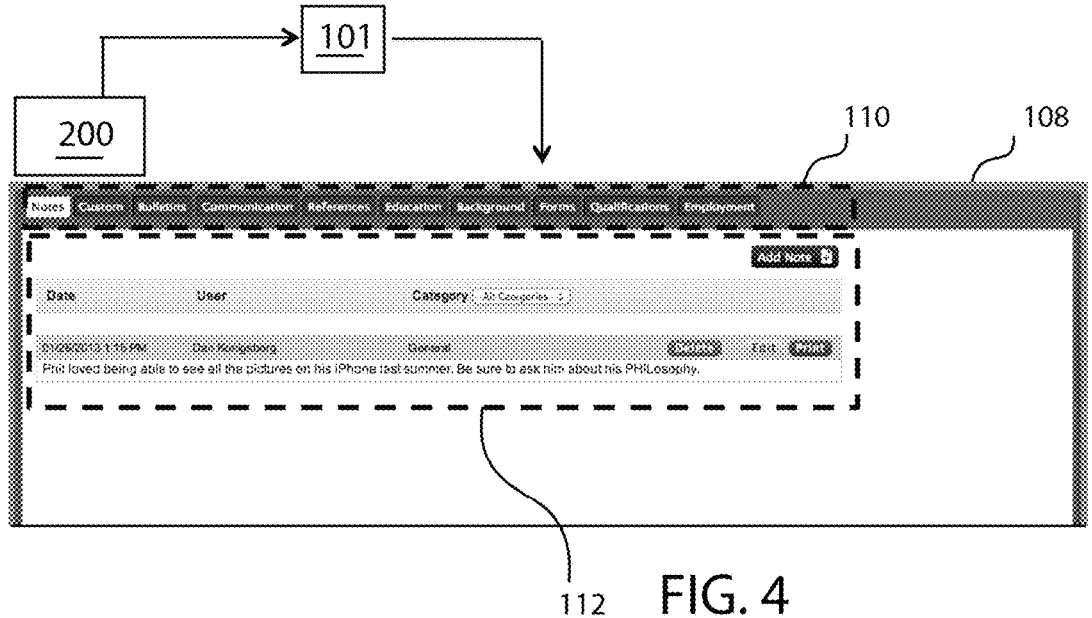
FIG. 4 is a schematic representation illustrating an example of application options for the application-menu area for each status indicator used in the periodic table of relationships, in accordance with an embodiment of the present disclosure.

Referring now to FIG. 4, FIG. 4 represents one embodiment of an application area 108 comprising an application-menu area 110, and an application-interface area 112. The application-menu area 110 may include a menu of applications based on an individual's relationships with the user's organization. The menu of applications may be customizable. The application that is displayed in the application interface area 112 may be selected by clicking on the application menu area or on a tile 116, tab 120, or additional tab 122 on a periodic table of relationships 109. For example, for the case where the person is a hired staff member, they may have an education application or a references application. For the case where the person is an attendee, they may have a cabin application, a homeroom application, a travel application, and/or a scheduling application. The foregoing are examples of applications that an organization can utilize through the application-menu area 110.

Still referring to FIG. 4, the application-menu area 110 may use an application-programming interface (API). An application-programming interface (API) specifies how some software components should interact with each other. In practice, most often an API is a library that includes specifications for routines, data structures, object classes, and variables. An API specification can take many forms, including an International Standard such as POSIX, vendor documentation such as the Microsoft Windows API, the libraries of a programming language, e.g., Standard Template Library in C++, Java API, or .net. The applications made available to the User may be correlated with the User's individual records and corresponding periodic table of relationships 109. By example only, a Hired Staff member will see different applications than a Staff Applicant. Additionally, a Lead Child is going to have a different set of applications than an Enrolled Child. Still referring to FIG. 4, the application-menu area 110 provides access to a (unique) set of applications (processor-executable code) based on a combination of the contact type and status indicator 118. The contact area 104 displays, e.g., by way of the periodic table of relationships 109, possible contact types (such as "Child") and associated status indicators for the contact type (such as "LD"); the following are examples: Child ("LD"), Child ("AP," "WL"), Child ("EN," "RE," "FO," "X"), Staff ("LD," "AP"), Staff ("HI," "RE," "FO," "X"), Adult ("AP," "WL"), Adult ("EN," "RE," "FO," "X"), Donor ("LD," "DO," "FO"), and/or Other ("C," "G").

Still referring to FIG. 4, the following applications may be provided for Child ("LD"): a family application, a bulletins application, a notes application (for general and/or for tours), a photo application, a custom application, and/or a communication application (for child members of the organization). The following applications may also be provided for Child ("AP," "WL"): a family application, a financial application, an accounts application, a medical application, a forms application, a dormitories application, a bulletins application, a notes application (for general and/or for tours), a photo application, a custom application, and/or a communication application (for camper members of the organization). The following applications may be provided for Child ("EN," "RE," "FO," "X"): a family application, a financial application, an accounts application, a medical application, a forms application, a dormitories application, a travel application, a scheduling application, a bulletins application, a notes application (for general and/or for tours), a photo application, a custom application, a communication application (for child members the organization).

Still referring to FIG. 4, following applications may be provided for Staff ("LD," "AP"): a photo application, an education application, a profile application having tabs for topics (for education, qualifications, references, employment, background), a bulletins application, a notes application, and/or a custom application. The following applications may be provided for Staff ("HI," "RE," "FO," "X"): a photo application, a financial application, an accounts application, a forms application, a medical application, a dormitories application, an education application, a profile application having tabs for topics (education, qualifications, references, employment, background), a travel application, a schedule application, a bulletins application, a notes application, a custom application, a communication application (for staff members of the organization).

Still referring to FIG. 4, the following applications may be provided for Adult ("AP," "WL"): a family application, a financial application, an accounts application, a medical application, a forms application, a dormitories application, a bulletins application, a notes application (for general and/or for tours), a photo application, a custom application, a communication application (for camper members of the organization). The following applications may be provided for Adult ("EN," "RE," "FO," "X"): a family application, a financial application, an accounts application, a medical application, a forms application, a dormitories application, a travel application, a scheduling application, a bulletins application, a notes application (for general and/or for tours), a photo application, a custom application, and/or a communication (child) application.

Still referring to FIG. 4, the following applications may be provided for Donor ("LD," "DO," "FO"): includes a notes application, a bulletins application, a communication application, a custom application, a donations application, and/or a forms application. The following applications may be provided for Other ("C," "G"): a notes application, a bulletins application, a communication application, a custom application, and/or a forms application. Each application may be unique in its functionality and may be customized based on the needs of the organization. An organization may provide their own application to be used as an application option for the application-menu area 110 for each status indicator used in the periodic table of relationships 109.

Referring to FIGS. 5 through 9, these schematic representations illustrate status indicators 118 of the periodic table of relationships 109, as shown in FIG. 2, in accordance with embodiments of the present disclosure. A set of status indicators 118 indicates to the User where the selected individual stands across (all) relationship types. For example, an individual can be a former child attendee, a current hired staff, and/or a parent of prospective attendee all at the same time. This information is displayed using the periodic table of relationships 109. Additionally, the periodic table of relationships 109 may display how many years the individual has been associated with a given relationship in a tab 120. Also, the periodic table of relationships 109 displays the selected individual's current status within a specific relationship type.

Figure 5:
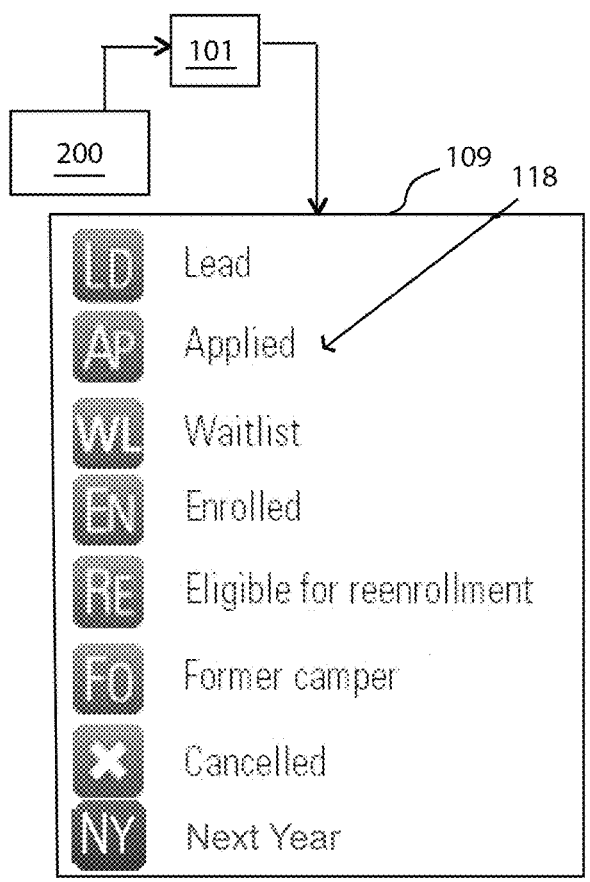
FIG. 5 is a schematic representation illustrating status indicators of the periodic table of relationships, as shown in FIG. 2B, in accordance with an embodiment of the present disclosure.

Referring to FIG. 5, this schematic representation illustrates status indicators 118 of the periodic table of relationships 109, as shown in FIG. 2, wherein the status indicators 118 relate to attendees of the organization, in accordance with an embodiment of the present disclosure. For attendees of the organization (both child and adult relationship indicators 114), the following status options may be provided: Lead ("LD"), Applied ("AP"), Waitlist ("WL"), Enrolled ("EN"), Eligible for re-enrollment ("RE"), Former attendee ("FO"), Cancelled ("X"), and/or additional status indicators. The status indicator 118 for Lead ("LD") may be for an individual that is a prospective attendee for the current, or future, business season of the organization. The status indicator 118 for Applied ("AP") may be for an individual who has applied, either themselves or through their legal guardian, for an event hosted by the organization. The status indicator 118 for Waitlist ("WL") may be for an individual who has applied but is not accepted due to capacity constraints. Instead of being cancelled, this individual is placed on the waitlist. The status indicator 118 for Enrolled ("EN") may be for an individual who is enrolled in at least one of the organization's programs for the current season. The status indicator 118 for Eligible for re-enrollment ("RE") may be for an individual who was enrolled in a prior business season and is eligible to re-enroll for the current business season. The status indicator 118 for Former attendee ("FO") may be for an individual who was enrolled in a prior business season and is no longer eligible to attend in his or her current partition. The status indicator 118 for Cancelled ("X") may be for an individual who was enrolled for a given business season but did not complete their event until the expected end time due to expulsion, withdrawal, or cancellation. The status indicator for 118 for Next Year ("NY") may be for an individual who is enrolled for the next year.

Figure 6:
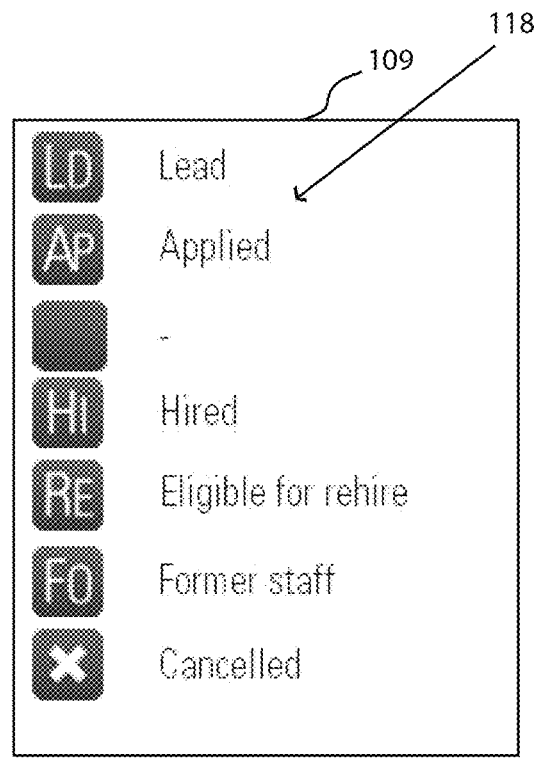
FIG. 6 is a schematic representation illustrating status indicators of the periodic table of relationships, as shown in FIG. 2B, in accordance with an embodiment of the present disclosure.

Referring to FIG. 6, this schematic representation illustrates status indicators 118 of the periodic table of relationships 109, as shown in FIG. 2, wherein the status indicators 118 relate to staff members of the organization, in accordance with an embodiment of the present disclosure. For staff members of the organization, the following status indicators 118 may be used: lead ("LD"), applied ("AP"), hired ("HI"), eligible for re-hire ("RE"), former staff ("FO"), and/or cancelled ("X"), or additional indicators. Lead ("LD") may be a prospective staff member for the current, or future, business season of the organization. Applied ("AP") may be an individual who has applied to work for the organization. Hired ("HI") may be an individual who is hired by the organization for the current season. Eligible for re-hire ("RE") may be an individual who was hired in a prior business season and is eligible to be re-hired for the current business season. Former staff ("FO") may be an individual who was hired in a prior business season and is no longer a potential employee. Cancelled ("X") may be an individual who was hired for a given business season but did not complete their employment until the expected end time due to expulsion, withdrawal, or cancellation.

Figure 7:
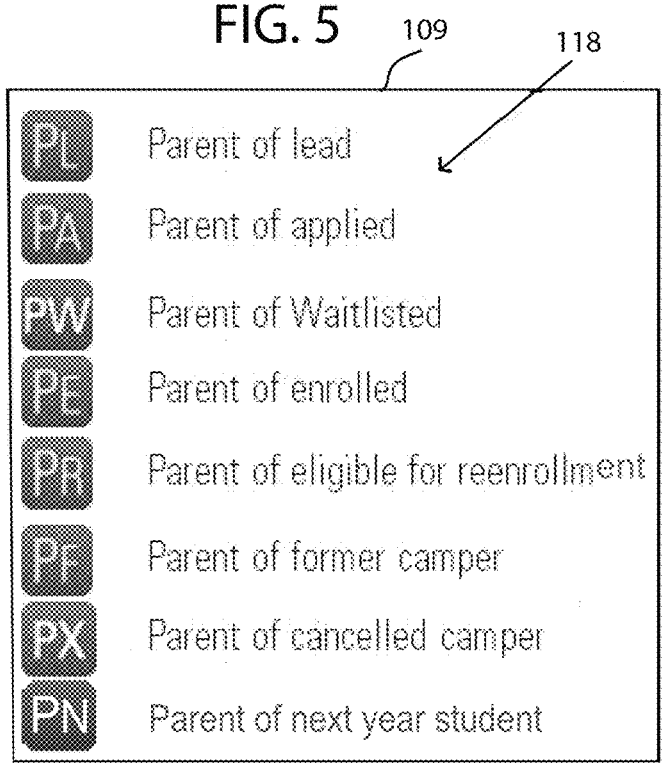
FIG. 7 is a schematic representation illustrating status indicators of the periodic table of relationships, as shown in FIG. 2B, in accordance with an embodiment of the present disclosure.

Referring to FIG. 7, this schematic representation illustrates status indicators 118 of the periodic table of relationships 109, as shown in FIG. 2, wherein the status indicators 118 may be related to the parents of attendees of the organization, in accordance with an embodiment of the present disclosure. For parents of attendees of the organization, the following status options may be provided: parent of a lead ("PL"), parent of an applied child ("PA"), parent of wait-listed child ("PW"), parent of an enrolled attendee ("PE"), parent of an attendee who is eligible for re-enrollment ("PR"), parent of a former attendee ("PF"), cancelled ("PX"), and/or additional status indicators. The parent of a lead ("PL") may be a parent of a prospective attendee for the current, or future, business season of the organization. The parent of an applied child ("PA") may be an individual who has applied his or her child for an event hosted by the organization. The parent of a wait-listed child ("PW") may be an individual who has applied his or her child but the child is not accepted due to capacity constraints. Instead of being cancelled, this individual's child is placed on the waitlist. The parent of an enrolled attendee ("PE") may be an individual whose child is enrolled in at least one of the organization's programs for the current season. The parent of an attendee who is eligible for re-enrollment ("PR") may be an individual whose child was enrolled in a prior business season and is eligible to re-enroll for the current business season. The parent of a former attendee ("PF") may be an individual whose child was enrolled in a prior business season and is no longer eligible to attend in his or her current partition. The parent of a next year student is ("PN") may be an individual whose child is enrolled for the next year. Cancelled ("PX") may be an individual whose Child was enrolled for the current business season but did not complete their event until the expected end time due to expulsion, withdrawal, and/or cancellation.

Figure 8:
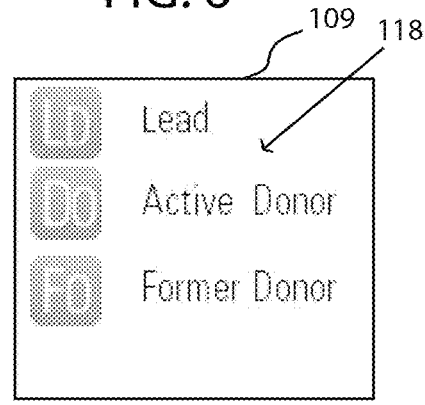
FIG. 8 is a schematic representation illustrating status indicators of the periodic table of relationships, as shown in FIG. 2B, in accordance with an embodiment of the present disclosure.

Referring to FIG. 8, this schematic representation illustrates status indicators 118 of the periodic table of relationships 109, as shown in FIG. 2, in which the status indicators 118 may be for donors of the organization, in accordance with an embodiment of the present disclosure. For donors of the organization, the following status options may be provided: donor lead ("LD"), active donor ("DO"), former donor ("FO"), and/or additional status indicators 118. Donor lead ("LD") may be a prospective donor for the current, or future, fundraising season of the organization. An active donor ("DO") may be an individual who had given or is currently giving towards the organization's fundraising season. A former donor ("FO") may be an individual who has given to the organization in a past fundraising season.

Figure 9:
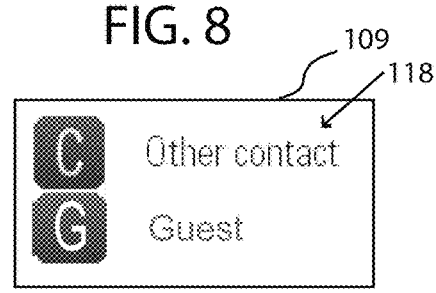
FIG. 9 is a schematic representation illustrating status indicators of the periodic table of relationships, as shown in FIG. 2B, in accordance with an embodiment of the present disclosure.

Referring to FIG. 9, this schematic representation illustrates status indicators 118 of the periodic table of relationships 109, as shown in FIG. 2, in which the status indicators are related to other entities, e.g., third party entities, in relation to the organization, in accordance with an embodiment of the present disclosure. For other entities, e.g., third party entities, the following status options may exist: contact ("C"), guest ("G"), and/or additional status indicators 118. A contact ("C") may be an arbitrary individual who has not attended, had his child attend, worked for, or donated to the organization's events. A guest ("G") may be an individual who has a relationship with an attendee or hired staff of the organization and is granted access to auxiliary systems to engage with the organization's events.

Figure 10:
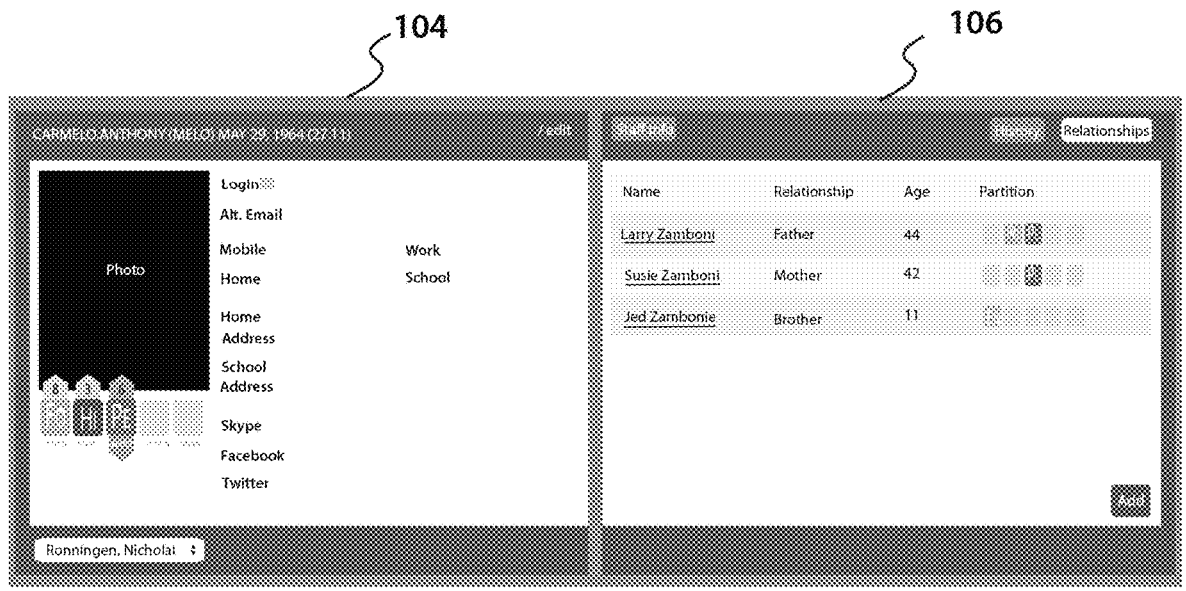
FIG. 10 is a schematic representation illustrating a contact area and an area corresponding to a situation, wherein an adult is a parent and an attendee of the organization, in accordance with an embodiment of the present disclosure.

Referring to FIG. 10, this schematic representation illustrates the contact area 104 and of the person-information area 106 for a case, wherein the adult is a parent and an attendee of the organization, in accordance with an embodiment of the present disclosure. An organization may wish to offer the ability for parents to attend an event, such as "Family Camp," and also send their child to "Summer Camp." These adults can have two statuses that are often not identical. For example, a parent of an applied child can also be enrolled in an event themselves. To handle these types of situations, the adult contact type may have an additional tab 122 under the periodic table of relationships 109, or attached to the first tab to indicate his or her status as an attendee. In the example below, the individual is a parent of a lead child and is also an enrolled attendee. When an adult has statuses as both a parent and an attendee, the parent status may take precedence, as shown with the periodic table of relationships 109 in a selected tile 116, and the attendee status may be displayed with a tab 120. The following status indicators 118 may be displayed in the adult attendee flag: lead ("L"), applied ("A"), enrolled ("E"), waitlist ("W"), eligible to re-enroll ("R"), former ("F"), and/or cancelled ("X"). The status indicators 118 disposed in the tabs 120, or additional tabs 122, are configured to indicate the number of years that the individual has been associated with that contact type within the organization.

Figure 11:
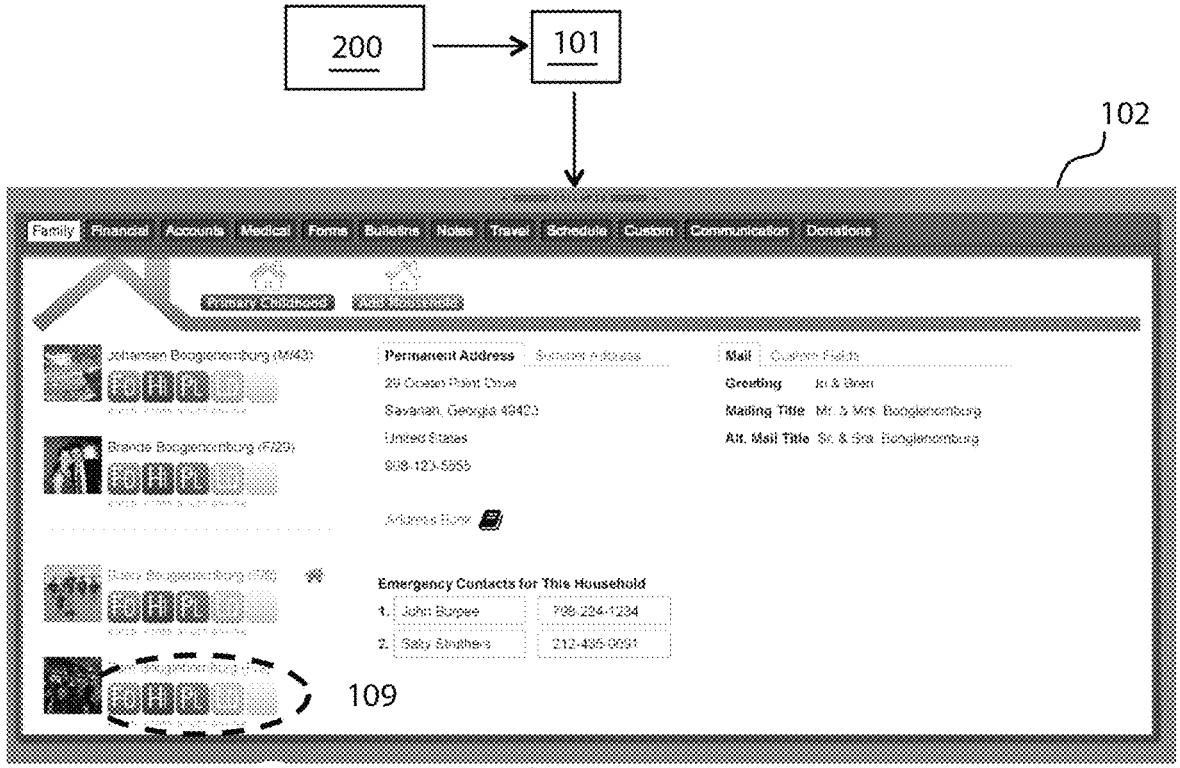
FIG. 11 is a schematic representation illustrating a household-information area of the unified-person record, in accordance with an embodiment of the present disclosure.

Referring to FIG. 11, this schematic representation illustrates a household-information area 102 of the unified-person record 101, as shown in FIG. 4, in accordance with an embodiment of the present disclosure. The household-information area 102, displaying household information, is accessible by the user via the application-menu area 110, as shown in FIG. 4. Each "household" corresponds to a "principal" individual, such as an adult person, e.g., a parent, a foster parent, a guardian, a nanny, and an au pair. The household comprises either a primary household and/or additional households such as: summer, mailing, mother, father, grandparents, etc; wherein each child may belong to a household designated as a primary household and other households being designated as they are. The household-information area 102 facilitates access to a person's information by users who may be involved in a shared child custody situation, a foster care situation, and the like. The household information area may also comprise a periodic table of relationships as defined above.

Referring to FIG. 12, this schematic representation illustrates a system S, comprising a server 100 configured to display the unified-person record 101, as shown in FIG. 1, in accordance with an embodiment of the present disclosure. A user of the system may submit the user's credentials, such as a user identifier and a password, etc., to the server 100. Once the server 100 has verified the authenticity of the credentials, the server 100 is configured to display the unified-person record 101 to the user. The user may then use the unified-person record 101 to gain access to information that may be available to the user (depending on their status). A client device, such as a user device 150, is capable of connecting with the server 100 via a network 152 (such as the Internet) with a signal. The user device 150 is configured to facilitate communication with the server 100. Examples of the user device 150 include a smart-phone, a laptop computer, etc. The unified-person record 101 may be displayed on a web page of a web browser displayed on the user device 150 (remote computer, portable computing device, smart phone, laptop computer, etc.), or may be displayed on a computer display connected to, for example, the server 100.

Still referring to FIG. 12 and referring back to FIGS. 1 through 10, a web page (or webpage) is a web document that is suitable for the World Wide Web and the web browser. A web browser displays a web page on a monitor (display) or a mobile electronic device. The web page is what displays, but the term also refers to a computer file, usually written in HTML or comparable markup language, whose main distinction is to provide hypertext that will navigate to other web pages via links. Web browsers coordinate web resources centered around the written web page, such as style sheets, scripts and images, to present the web page. On a network, a web browser can retrieve a web page from a remote web server. On a higher level, the web server may restrict access to only a private network such as a corporate intranet or it provide access to the World Wide Web. On a lower level, the web browser uses the Hypertext Transfer Protocol (HTTP) to make such requests. A static web page is delivered exactly as stored, as web content in the web server's file system, while a dynamic web page is generated by a web application that is driven by server-side software or client-side scripting. Dynamic web pages help the browser (the client) to enhance the web page through user input to the server.

Still referring to FIG. 12 and still referring back to FIGS. 1-10, a web browser (commonly referred to as a browser) is a software application for retrieving, presenting and traversing information resources on the World Wide Web. An information resource is identified by a Uniform Resource Identifier (URI) and may be a web page, image, video or other piece of content. Hyperlinks present in resources enable users easily to navigate their browsers to related resources. Although browsers are primarily intended to use the World Wide Web, they can also be used to access information provided by web servers in private networks or files in file systems. The major web browsers currently used today are Google® Chrome®, Mozilla® Firefox®, Internet Explorer®, Opera®, and Safari®.

Still referring to FIG. 12 and still referring back to FIGS. 1-10, for the case where a web browser is to be displayed on a web browser (for use by the user), in accordance with an example, the apparatus 200 includes a web page displayed on a web browser. The web page displays the unified-person record 101 to the user. The unified-person record 101 has the contact area 104 configured to display contact information of the individual being associated with the organization. Also, the unified-person record 101 also has the periodic table of relationships 109 configured to display relationships of the individual identified by the contact area 104 relative to members of the organization. The unified-person record 101 may further include the options and variations herein described.

Still referring to FIG. 12 and still referring back to FIGS. 1 through 10, for the case where an electronic-display assembly (computer display, etc.) is to be used by the user, in accordance with an example, the apparatus 200 includes an electronic-display configured to display the unified-person record 101 to the user. The unified-person record 101 has the contact area 104 configured to display contact information of the individual being associated with the organization. Also, the unified-person record 101 also has the periodic table of relationships 109 configured to display relationships of the individual identified by the contact area 104 relative to members of the organization. The unified-person record 101 may further include the options and variations herein described.

Still referring to FIG. 12 and still referring back to FIGS. 1 through 10, for the case wherein the server 100 transmits computer-executable instructions to the user device 150, in which the computer-executable instructions are to be used to instruct the user device 150 to display the unified-person record 101 to the user, in accordance with an example, the apparatus 200 includes a computer. The computer has a display and also has a computer-usable medium (computer readable memory device, etc.). The computer-usable medium tangibly embodies computer-executable instructions configured to instruct the computer to display the unified-person record 101 on the display.

Servers

Still referring to FIG. 12, a server 100 may be a physical computer, e.g., a computer hardware system, dedicated to run one or more services, e.g., as a host, to serve the needs of the users of other computers on a network. A server 100 may also be a virtual machine ("VM"). The virtual machine is a simulation of a computer system (abstract or real) that is usually different from the target computer system (on which it is simulated). A server 100 may be a cloud-based server. Cloud computing is a colloquial expression or a term of art used to describe a variety of different computing concepts that involve a large number of computers that are connected through a (real-time) communication network (typically the Internet). Cloud computing is also a synonym for distributed computing over a network and denotes the ability to run a program on many connected computers at the same time.

Virtual machines may be based on the specifications of a hypothetical computer or emulate the architecture and functioning of a real-world computer. The virtual machine is a software implementation of the physical computer system that executes programs like a physical machine. Virtual machines are separated into two major categories, based on their use and degree of correspondence to any real machine. A system virtual machine provides a complete system platform, which supports the execution of a complete operating system (OS). These virtual machines usually emulate an existing architecture and are built with either the purpose of providing a platform to run programs, wherein the real hardware is not available for use (for example, executing software on otherwise obsolete platforms), or the purpose of having multiple instances of virtual machines, leading to more efficient use of computing resources, both in terms of energy consumption and cost effectiveness (known as hardware virtualization, the key to a cloud computing environment), or both purposes.

Still referring to FIG. 12, a process virtual machine (also, language virtual machine) is designed to run a single program, e.g., that the process virtual machine supports a single process. Such virtual machines are usually closely suited to one or more programming languages and built with the purpose of providing program portability and flexibility (amongst other things). An essential characteristic of a virtual machine is that the software running inside is limited to the resources and abstractions provided by the virtual machine, e.g., the virtual machine cannot break from its virtual environment. Depending on the computing service that the virtual machine offers, the virtual machine could be a database server, file server, mail server, print server, web server, gaming server, or some other kind of server. In the context of client-server architecture, a server is a computer program running to serve the requests of other programs, the clients. Thus, the server performs some computational task on behalf of clients. The clients either run on the same computer or connect through the network. In the context of Internet Protocol (IP) networking, a server is a program that operates as a socket listener. Servers often provide essential services across a network, either to private users inside a large organization or to public users via the Internet.

Still referring to FIG. 12, according to one option, the servers include computer-executable instructions configured to operate the servers in accordance with the description herein provided. The servers may use computer software, or just software, which is a collection of computer programs (server-executable instructions) and related data that provide the instructions for instructing the servers what to do and how to do it. In other words, software is a conceptual entity that is a set of computer programs, procedures, and associated documentation concerned with the operation of a controller assembly, also called a data-processing system. Software refers to one or more computer programs and data held in a storage assembly (a memory module) of the controller assembly for some purposes. In other words, software is a set of programs, procedures, algorithms and its documentation. Program software performs the function that the program implements, either by directly providing instructions to computer hardware or by serving as input to another piece of software.

Still referring to FIG. 12, in computing, an executable file (executable instructions) causes the servers to perform indicated tasks according to encoded instructions, as opposed to a data file that must be parsed by a program to be meaningful. These instructions are machine-code instructions for a physical central processing unit. However, in a more general sense, a file containing instructions (such as byte-code) for a software interpreter may also be considered executable; even a scripting language source file may therefore be considered executable in this sense. While an executable file can be hand-coded in machine language, more usual is developing software as source code in a high-level language understood by humans, or in some cases, an assembly language more complex for humans but more closely associated with machine code instructions. The high-level language is compiled into either an executable machine code file or a non-executable machine-code object file; the equivalent process on assembly language source code is called assembly. Several object files are linked to create the executable machine code file. The same source code can be compiled to run under different operating systems, usually with minor operating-system-dependent features inserted in the source code to modify compilation according to the target.

Still referring to FIG. 12, conversion of existing source code for a different platform is called porting. Assembly-language source code and executable programs are not transportable in this way. An executable comprises machine code for a particular processor or family of processors. Machine-code instructions for different processors are completely different and executables may be incompatible. Some dependence on the particular hardware, such as a particular graphics card may be coded into the executable. Removing such dependencies from executable programs designed to run on a variety of different hardware is possible, instead of installing hardware-dependent device drivers on the servers, which the program interacts with in a standardized way.

Still referring to FIG. 12, some operating systems designate executable files by filename extension (such as .exe) or noted alongside the file in the file's metadata (such as by marking an execute-permission, e.g., in Unix, or the like, operating systems). Most operating systems also check that the file has a valid executable file format to safeguard against random bit sequences inadvertently being run as instructions. Operating systems retain control over the resources of the servers, requiring that individual programs make system calls to access privileged resources. Since each operating system features its own system call architecture, executable files are generally tied to specific operating systems, or families of operating systems. Many tools are available that make executable files made for one operating system work on another one by implementing a similar or compatible application binary interface. When the binary interface of the hardware for which the executable file was compiled differs from the binary interface on which the executable file is run, the program performing the translation is called an emulator. Different files that can execute, but do not necessarily conform to a specific hardware binary interface or instruction set, can be represented either in byte-code for "just-in-time" compilation or in source code for use in a scripting language.

Still referring to FIG. 12, according to another option, the servers may include application-specific integrated circuits configured to operate the servers, in accordance with the above description provided. In yet another option, the servers may include a combination of the application-specific integrated circuits and the software. An alternative to using software (controller-executable instructions) in the server is using an application-specific integrated circuit (ASIC) which is an integrated circuit (IC) customized for a particular use, rather than intended for general-purpose use. For example, a chip designed solely to run a cell phone is an ASIC. Some ASICs include entire 32-bit processors, memory blocks including ROM (random only memory), RAM (random access memory), EEPROM (electronically erasable programmable read only memory), flash memory, and other large building blocks. Such an ASIC is often termed a SoC (system-on-chip).

Still referring to FIG. 12, in digital ASICs, a hardware description language (HDL) is used to describe the functionality of ASICs. Field-programmable gate arrays (FPGA) are used for building a breadboard or prototype from standard parts; programmable logic blocks and programmable interconnects allow the same FPGA to be used in many different applications. For smaller devices and/or lower production volumes, FPGAs may be more cost effective than an ASIC design. A field-programmable gate array (FPGA) is an integrated circuit designed to be configured by the customer or designer after manufacturing, hence the integrated circuit is field-programmable. The FPGA configuration is generally specified using a hardware description language (HDL), similar to that used for an application-specific integrated circuit (ASIC) (circuit diagrams were previously used to specify the configuration, as they were for ASICs, but this is increasingly less frequent). FPGAs can be used to implement any logical function that an ASIC can perform. The ability to update the functionality after shipping, partial re-configuration of the portion of the design and the low non-recurring engineering costs relative to an ASIC design offer benefits for many applications.

Still referring to FIG. 12, FPGAs contain programmable logic components called logic blocks, and a hierarchy of reconfigurable interconnects that allow the blocks to be wired together, e.g., somewhat like many (changeable) logic gates that can be inter-wired in (many) different configurations. Logic blocks can be configured to perform complex combinational functions, or merely simple logic gates like AND and XOR. In most FPGAs, the logic blocks may include memory elements, which may be simple flip-flops, or more complete blocks of memory. In addition to digital functions, some FPGAs have analog features. An analog feature is a programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slow. Another conventional analog feature is a plurality of differential comparators on input pins adapted for connection with differential signaling channels. A few "mixed signal FPGAs" have integrated peripheral Analog-to-Digital Converters (ADCs) and Digital-to-Analog Converters (DACs) with analog signal conditioning blocks, thereby allowing them to operate as a system-on-a-chip. Such devices blur the line between an FPGA, which carries digital ones and zeros on its internal programmable interconnect fabric, and a field-programmable analog array (FPAA), which carries analog values on its internal programmable interconnect fabric.

Server (Computer) Programming Language

Still referring to FIG. 12, a computer programming language is an artificial language designed to communicate instructions to a machine, particularly (or such as) a computer system. Programming languages can be used to create programs that control the behavior of a machine and/or to express algorithms precisely. The earliest programming languages predate the computer system, and were used to direct the behavior of machines, such as jacquard looms and player pianos. Thousands of different programming languages have been created, mainly in the computer field, with many being created every year. Most programming languages describe computation in an imperative style, e.g., as a sequence of commands, although some languages, such as those that support functional programming or logic programming, use alternative forms of description. The description of a programming language is usually split into the two components of syntax (form) and semantics (meaning). Some languages are defined by a specification document (for example, the C programming language is specified by an ISO Standard), while other languages, such as PERL, have a dominant implementation that is used as a reference. PERL may be used, but other computer programming languages may be employed or used (if so desired).

Executable Code (Instructions)

Still referring to FIG. 12, in computing, an executable code (file) causes a computer "to perform indicated tasks according to encoded instructions," whereas a data file must be parsed by a program to be meaningful. Executable code (instructions) is formed based on instructions made from a computer programming language. These instructions are machine code instructions for a physical CPU. However, in a more general sense, a file containing instructions (such as byte-code) for a software interpreter may also be considered executable. Even a scripting language source file may, therefore, be considered executable in this sense. The exact interpretation of the phrase "file containing instructions" depends on the use. While the phrase "file containing instructions" often refers only to machine code files, in the context of protection against computer viruses that may corrupt "files in general," wherein potentially hazardous instruction execution, including scripts, is caused, such "files" terminology is frequently used together.

Still referring to FIG. 12, while an executable file can be hand-coded in machine language, developing software as source code in a high-level language is a form that is easily understood by humans, or, in some cases, in an assembly language that is more complex for humans, but is more closely associated with machine code instructions. The high-level language is compiled into either an executable machine code file or a non-executable machine-code object file of some sort; and the equivalent process on assembly language source code is called assembly. Several object files are linked to create the executable. The same source code can be compiled to run under different operating systems, usually with minor operating-system-dependent features inserted in the source code to modify compilation according to the target. Conversion of existing source code for a different platform is called porting. Assembly-language source code, and executable programs, is not transportable in this way. An executable program comprises machine code for a particular processor or family of processors. Machine-code instructions for different processors are completely different; and executable programs may be incompatible. Some dependence on the particular hardware, such as a particular graphics card, may be coded into the executable program. Removing such dependencies from executable programs intended to run on a variety of different hardware, instead of installing hardware-dependent device drivers on the computer with which the program interacts in a standardized way, is a usual approach.

The Internet

Still referring to FIG. 12, the Internet is a global system of interconnected computer networks that use the standard Internet protocol suite (often called TCP/IP, although not all applications use TCP) to serve billions of users worldwide. The Internet is a "network of networks," comprising millions of private, public, academic, business, and government networks, of local to global scope, that are linked by a broad array of electronic, wireless, and optical networking technologies. The Internet carries an extensive range of information resources and services, such as the inter-linked hypertext documents used in the World Wide Web (WWW) and the infrastructure to support email. Most traditional communications media including telephone, music, film, and television, are being reshaped or redefined by the Internet, thereby imparting new services such as Voice over Internet Protocol (VoIP) and Internet Protocol Television (IPTV). The Internet is an example of a network, as contemplated by the embodiments of the present disclosure.

Network

Still referring to FIG. 12, a computer network, or simply a network, is a collection of computers and other hardware interconnected by communication channels that allow sharing of resources and information. Where at least one process in one device is able to send/receive data to/from at least one process residing in a remote device, then the two devices are said to be in a network. A network is a group of devices connected to each other. Networks may be classified into a wide variety of characteristics, such as the medium used to transport the data, a communications protocol used, scale, topology, benefit, and organizational scope. Communications protocols define the rules and data formats for exchanging information in a computer network and provide the basis for network programming.

Still referring to FIG. 12, a communications protocol includes an Ethernet standard, hardware, a link layer standard that is ubiquitous in local-area networks, and the Internet protocol suite which defines a set of protocols for internet-working, i.e., for data communication between multiple networks host-to-host data transfer, and application-specific data transmission formats. Computer networking is sometimes considered a sub-discipline of electrical engineering, telecommunications, computer science, information technology, or computer engineering, since it relies upon the application of these disciplines.

Client-Server Architecture

Still referring to FIG. 12, a client/server model is a computing model that acts as a distributed application for partitioning tasks or workloads between the providers of a resource or service, called "servers," and service requesters, called "clients." Often clients and servers communicate over a computer network on separate hardware, but both client and server may reside in the same system. A server machine is a host that is running one or more server programs, which share their resources with clients. A client does not share any of its resources, but requests a server's content or service function. Clients, therefore, initiate communication sessions with servers, which await incoming requests. The client/server characteristic describes the relationship of cooperating programs in an application. The server component provides a function or service to one or many clients, which initiate requests for such services.

Still referring to FIG. 12, a notable example of the client-server model is the manner in which an OpenGL treats the video card of a computer as a server, wherein the actual application is capable of rendering requests to the server. This model is further solidified with the OpenGL Shading Language, wherein the user writes small programs that reside in the video memory and are requested from the main program through the graphics driver. Functions, such as email exchange, web access, and database access, are built on the client-server model. Users accessing banking services from their computers use a web browser client for sending a request to a web server located at a bank. That web server runs a program that may, in turn, forward the request to its own database client program, and which then sends a request to the bank's database server (running on another computer) to retrieve the account information. The balance and transaction records are returned to the bank database client, which, in turn, serves the balance and transaction records back to the user's web browser client, thereby displaying the results to the user. The client-server model has become one of the central aspects of network computing.

Still referring to FIG. 12, many business applications that are written today use the client-server model, as do the Internet's main application protocols, such as HTTP (Hypertext Transfer or Transport Protocol), SMTP (Simple Mail Transfer Protocol), Telnet (a network protocol that allows a user on one computer to log on to another computer that is part of the same network), and/or DNS (Domain Name System). The interaction between client and server is often described using sequence diagrams. The Unified Modeling Language has support for sequence diagrams. Specific types of clients include web browsers, email clients, and online chat clients. Specific types of servers include web servers, FTP (file transfer protocol) servers, application servers, database servers, name servers, mail servers, file servers, print servers, and terminal servers. Most web services also involve many types of servers.

Information, as herein shown and described in detail, is fully capable of attaining at least the above-described functions of the present disclosure and the presently preferred embodiment of the present disclosure; and is, thus, representative of the subject matter which is broadly contemplated by the present disclosure. The scope of the present disclosure fully encompasses other embodiments which may become apparent to those skilled in the art, and is believed to be encompassed by the appended claims, wherein any reference to an element in the singular is not intended to mean "one and only one," unless explicitly so stated, but rather "one or more." All structural and functional equivalents to the elements of the above described preferred embodiment and additional embodiments, as regarded by those of ordinary skill in the art, are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

Glossary

For the purposes of promoting an understanding of the principles of the present disclosure, reference will now be made to the embodiments illustrated in the drawings and specific language will be used to describe the same.

The following are definitions of terms used in the Specification:

User: a user is a person who performs tasks or accesses data via a server.

User's organization: a User's organization is an organization to which a user belongs. In a detailed embodiment the User's organization is a camp.

Individuals: individuals may be real or fictitious: persons, companies, groups, organizations, entities, or animals.

Organizations: an organization is a subset of individuals including groups of more than one human people. Organizations may include, but are not limited to: camps, churches, schools, nonprofit organizations, corporations and other institutions.

Unified-person record: a unified-person record is a software user-interface display, or more simply, a graphical-user interface for use by a server.

Contact area: a contact area comprises displaying contact information for an individual associated with a User's organization, the contact information may include at least one of: the name of the selected individual, an address, phone numbers (home number, cellular number, fax), an e-mail address, website addresses, social media pages such as Facebook or LinkedIn, and/or photographic images of the selected individual. The contact area may also comprise one or more periodic tables of relationships.

Person-information area: a person-information area comprises of applications displaying names of individuals who are related to the User's organization who are also related to the individual in the contact area, it may also comprise one or more periodic table of relationships. The area may also consist of other applications such as history and other personal details.

Application area: a application area comprises displaying one or more applications available for use by a user; such applications may be used to enter information which determines what information is displayed in one or more periodic tables of relationships. Such applications may be customizable.

Periodic table of relationships: A periodic table of relationships comprises an arrangement of two or more tiles positioned in close proximity to each other; the tiles may comprise geometric graphic icons of various dimensions and colors that may also display one or more letters, numbers, or symbols. The periodic table of relationships may also include relationship indicators, color indicators, status indicators, tabs, and additional tabs; all of which may provide separate indications that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

Tiles: a tile may comprise geometric graphic images such as squares or icons of various dimensions and colors that may also display one or more letters, numbers, or symbols.

Relationship indicator: a relationship indicator is displayed in close proximity to a specific tile for which it defines a specific subset of one or more records of information that the User's organization may keep for an individual; such records may also define one or more relations that specific individual has in relation to at least one of: the User's organization, one or more other individuals, one or more additional organizations, other individuals and/or organizations with each other, and/or other individuals or organizations to said User's organization.

Color indicator: a color indicator is one or more color(s) displayed on a tile, tab, or additional tab that may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

Status indicator: a status indicator is one or more letters, numbers, or symbols that may be displayed on a tile, tab, or additional tab that may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

Tabs: a tab may be attached to a tile and may comprise geometric graphics of various dimensions and colors that may also display one or more letters, numbers, or symbols; that may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

Additional tabs: an additional tab may be attached to a tab and may comprise geometric graphics of various dimensions and colors that may also display one or more letters, numbers, or symbols; that may indicate that the User's organization keeps one or more records of information for an individual; such records may also define one or more relations that specific individual has in relation to at least one of: the User's organization, one or more other individuals, one or more additional organizations, other individuals and/or organizations with each other, and/or other individuals or organizations to said User's organization.

Session: also called a program, a session is an event created by the organization and/or the event at which individuals may attend or work. The event may have a start time and date and an end time and date, and/or an optional cost.

Application: an application includes server-executable instructions tangibly embodied in a server-readable medium, such as a hard drive. The server-executable instructions are configured to direct operation of a server, such as a processor of a computer.

Server: a server is a system, such as a combination of software and suitable computer hardware, that responds to requests across a computer network to provide, or help to provide, a network service. Servers may be run on a dedicated computer, which is also often referred to as "the server," but many networked computers are capable of hosting servers. In many cases, a computer can provide several services and have several servers running Servers may operate within a client-server architecture, servers are computer programs running to serve the requests of other programs, the clients. Thus, the server performs some task on behalf of clients. The clients may connect to the server through the network, such as the Internet or a private network, but may run on the same computer. In the context of Internet Protocol (IP) networking, a server is a program that operates as a socket listener.

What is claimed:

1. A method of handling one or more records of an individual's information for a User's organization executable by way of instructions stored in a non-transitory computer usable medium, the method comprising:
   generating a graphical user interface comprising the steps of:
   (1) displaying a contact area with information of an individual associated with the User's organization;
   (2) displaying, in the contact area, a periodic table of relationships for information corresponding to the individual, said periodic table of relationships comprising:
   (a) at least two tiles positioned next to each other, each tile indicating information stored by the user's organization and corresponding to the individual;
   (b) at least one status indicator displayed on one of the tiles and having one or more letters, numbers, or symbols to indicate a standing of the individual across relationship types;
   (c) a relationship indicator displayed next to an edge of one of the at least two tiles and defining a relationship of the individual to at least one of one or more individuals not in said User's organization or one or more other organizations not in said User's organization; and
   (d) a color indicator displayed on the tile to indicate how the relationship defined by the status indicator and the relationship indicator applies to the individual;
   wherein each of said contact area, at least two tiles, at least one status indicator, relationship indicator and color indicator are viewable on a single user interface; and
   (3) displaying an application-interface area using an application-programming interface wherein applications displayed to the User are correlated with the information of the individual and correspond to said periodic table of relationships such that displayed applications differ among different types of users.

2. The method of claim 1, wherein said relationship indicator comprises at least one of words: child, kid, or camper.

3. The method of claim 1, wherein displaying said periodic table of relationships further comprises displaying a tab adjacent to and adjoining an edge of one of said tiles, to indicate a duration of the relationships defined by the status indicator displayed on the tile and the relationship indicator displayed next to the tile.

4. The method of claim 3, wherein said periodic table of relationships further comprises displaying at least one additional tab adjacent to and adjoining one edge of said tab, to indicate a second duration corresponding to the relationships defined by the status indicator displayed on the tile and the relationship indicator displayed next to the tile.

5. The method of claim 1, further comprising displaying a person-information area with additional information relevant to the individual, including:
   historical information about the individual identified in the contact area; and
   at least one second periodic table of relationships for relationship information between the individual identified in the contact area.

6. The method of claim 1, further comprising displaying an application area including one or more available applications determined in response to selection of at least one of the two tiles, the relationship indicator, a tab, and an additional tab.

7. The method of claim 6, further comprising displaying a household information area via user interaction with the application area.

8. The method of claim 1, wherein the periodic table of relationships is displayable by at least one of:
   a web page displayed on a web browser;
   a computer having a display and also having a computer-usable medium tangibly embodying computer-executable instructions configured to instruct the computer to display a record on the display.

9. The method of claim 1, wherein the color indicator comprises a first color to indicate that the relationship defined by the relationship indicator applies directly to the individual and a second color, different from the first color, to indicate that the relationship defined by the relationship indicator applies to an organization.

10. The method of claim 3, wherein the tab is a five-sided polygon with two angled top planes to be shaped like a house.

11. A method of handling one or more records of an individual's information for a User's organization executable by way of instructions stored in a non-transitory computer usable medium, the method comprising:
generating a graphical user interface comprising the steps of:
  (1) displaying a contact area with information of an individual associated with the User's organization;
  (2) displaying, in the contact area, a periodic table of relationships for information corresponding to the individual, said periodic table of relationships comprising:
    (a) at least two tiles positioned next to each other, each tile indicating information stored by the user's organization and corresponding to the individual, each tile comprising a geometric graphic icon including colors, numbers, or symbols;
    (b) at least one status indicator displayed on one of the tiles and having one or more letters, numbers, or symbols to indicate a standing of the individual across relationship types;
    (c) a relationship indicator displayed next to an edge of one of the at least two tiles and defining a relationship of the individual to at least one of one or more other individuals not in said User's organization or one or more other organizations not in said User's organization; and
  (3) displaying an application-interface area using an application-programming interface wherein applications displayed to the User are correlated with the information of the individual and correspond to said periodic table of relationships such that displayed applications differ among different types of users.

12. A method of handling one or more records of an individual's information for a User's organization executable by way of instructions stored in a non-transitory computer usable medium, the method comprising:
generating a graphical user interface comprising the steps of:
  (1) displaying a contact area with information of an individual associated with the User's organization;
  (2) displaying, in the contact area, a periodic table of relationships for information corresponding to the individual, said periodic table of relationships comprising:
    (a) at least two tiles positioned next to each other, each tile indicating information stored by the user's organization and corresponding to the individual and each tile being represented by a geometric graphic icon;
    (b) a status indicator displayed on each of the tiles and having one or more letters, numbers, or symbols to indicate a standing of the individual across relationship types, said status indicator being positioned to adjoin a corresponding tile;
    (c) a relationship indicator displayed next to an edge of one of the at least two tiles and defining a relationship of the individual to at least one of one or more other individuals not in said User's organization or one or more other organizations not in said User's organization;
    (d) a color indicator displayed on the tile to indicate how the relationship defined by the status indicator and the relationship indicator applies to the individual;
  (3) displaying an application-interface area using an application-programming interface wherein applications displayed to the User are correlated with the information of the individual and correspond to said periodic table of relationships such that displayed applications differ among different types of users; and
wherein each of said contact area, at least two tiles, status indicator, relationship indicator and color indicator are viewable on a single user interface.

* * * * *